(12) United States Patent
Nagai et al.

(10) Patent No.: US 10,882,114 B2
(45) Date of Patent: Jan. 5, 2021

(54) APPARATUS FOR PRODUCING FINE PARTICLES AND METHOD FOR PRODUCING FINE PARTICLES

(71) Applicant: Panasonic Intellectual Property Management Co., Ltd., Osaka (JP)

(72) Inventors: Hisao Nagai, Osaka (JP); Takafumi Okuma, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 80 days.

(21) Appl. No.: 16/251,040

(22) Filed: Jan. 17, 2019

(65) Prior Publication Data

US 2019/0151955 A1    May 23, 2019

Related U.S. Application Data

(62) Division of application No. 14/885,979, filed on Oct. 16, 2015, now Pat. No. 10,226,821.

(30) Foreign Application Priority Data

Jan. 20, 2015    (JP) ................................ 2015-008620

(51) Int. Cl.
*B22F 9/14* (2006.01)
*C04B 35/622* (2006.01)
(Continued)

(52) U.S. Cl.
CPC .............. *B22F 9/14* (2013.01); *C04B 35/111* (2013.01); *C04B 35/14* (2013.01); *C04B 35/573* (2013.01);
(Continued)

(58) Field of Classification Search
None
See application file for complete search history.

(56) References Cited

U.S. PATENT DOCUMENTS

| | | | |
|---|---|---|---|
| 4,732,369 | A | 3/1988 | Araya et al. |
| 5,935,461 | A | 8/1999 | Witherspoon et al. |

(Continued)

FOREIGN PATENT DOCUMENTS

| | | |
|---|---|---|
| JP | 2-282407 | 11/1990 |
| JP | 6-279015 | 10/1994 |

(Continued)

OTHER PUBLICATIONS

English Translation of Chinese Search Report dated Apr. 5, 2017 for the related Chinese Patent Application No. 201510947370.0.

*Primary Examiner* — George Wyszomierski
(74) *Attorney, Agent, or Firm* — Wenderoth, Lind & Ponack, L.L.P.

(57) ABSTRACT

An apparatus and a method for producing fine particles includes a vacuum chamber, a material feeding device connected to the vacuum chamber and feeding material particles into the vacuum chamber from material feeing ports, and a plurality of electrodes connected to the vacuum chamber. Tip ends of the electrodes protrude into the vacuum chamber to generate plasma, and a collecting device is connected to the vacuum chamber and collects fine particles. The electrodes generate discharge inside the vacuum chamber and produce the fine particles from the material. The material feeding ports of the material feeding device are arranged in a lower side than (below) the plural electrodes in the vertical direction in the vacuum chamber.

7 Claims, 4 Drawing Sheets

(51) Int. Cl.
  *C04B 35/14*    (2006.01)
  *C04B 35/111*   (2006.01)
  *C04B 35/573*   (2006.01)
  *C04B 35/591*   (2006.01)
  *C04B 35/628*   (2006.01)
  *B22F 1/00*     (2006.01)
  *C01F 7/02*     (2006.01)

(52) U.S. Cl.
  CPC ...... *C04B 35/591* (2013.01); *C04B 35/62813* (2013.01); *C04B 35/62834* (2013.01); *B22F 1/0018* (2013.01); *B22F 2999/00* (2013.01); *C01F 7/023* (2013.01); *C01P 2004/64* (2013.01); *C04B 2235/5454* (2013.01)

(56) References Cited

U.S. PATENT DOCUMENTS

| | | |
|---|---|---|
| 6,358,375 B1 | 3/2002 | Schwob |
| 8,137,588 B2 | 3/2012 | Hafiz et al. |
| 10,124,406 B2 | 11/2018 | Nagai .................... B22R 1/0018 |
| 10,252,339 B2* | 4/2019 | Nagai ........................ B22F 9/16 |
| 2005/0016953 A1* | 1/2005 | Arai .................... G01N 15/0205 216/59 |
| 2006/0065516 A1 | 3/2006 | Matsuura et al. |
| 2015/0079310 A1 | 3/2015 | Park et al. |
| 2015/0126044 A1 | 5/2015 | Kato .................... C23C 16/4584 438/790 |
| 2017/0136546 A1 | 5/2017 | Nagai .................... B01J 19/088 |

FOREIGN PATENT DOCUMENTS

| | | |
|---|---|---|
| JP | 7-187631 A | 7/1995 |
| JP | 8-067503 | 3/1996 |
| JP | 2002-045684 | 2/2002 |
| JP | 2002-504057 A | 2/2002 |
| JP | 2002-253954 | 9/2002 |
| JP | 2004-263257 A | 9/2004 |
| JP | 2005-343784 A | 12/2005 |
| WO | 2011/054113 | 5/2001 |
| WO | 2014/152062 A2 | 9/2014 |

\* cited by examiner

APPARATUS FOR PRODUCING FINE PARTICLES AND METHOD FOR PRODUCING FINE PARTICLES

TECHNICAL FIELD

The present invention relates to an apparatus for producing fine particles and a method for producing fine particles, which are utilized for a coating material with respect to a film material for food packaging or an ink raw material used for an electronic device wiring and so on.

BACKGROUND

In recent years, fine particles in nanometer order are considered to be applied to various devices. For example, metal fine particles of nickel are currently used for a ceramic capacitor, and the use of fine particles having a particle size of 200 nanometer or less with good dispersibility is considered for a next-generation ceramic capacitor.

Additionally, fine particles of silicon monoxide (SiOx: x=1 to 1.6) with a lower oxygen content than silicon dioxide are utilized as a deposition material for an antireflective film of an optical lens or a gas barrier film for food packaging.

As common methods of producing fine particles in nanometer order, there are a method of introducing a bulk material as a raw material with beads of ceramic or zirconia and atomizing the material by mechanical pulverization, a method of melting and evaporating the material and spraying the material to air or water to obtain fine particles and methods for obtaining fine particles chemically such as electrolysis or reduction. Among them, a method of using thermal plasma (approximately 10000° C.) such as high-frequency plasma or arc plasma to fabricate fine particles in a vapor phase is extremely useful from viewpoints that the dispersibility of the produced fine particles is excellent with reduced contamination, and that composite fine particles made of plural kinds of materials can be synthesized easily (for example, refer to JP-A-2002-45684 (Patent Document 1)).

FIG. 4 is a schematic cross-sectional view of an apparatus for producing fine particles using multi-arc plasma in a related-art example 1.

A plurality of bar-shaped electrodes 204 are circumferentially arranged on a ceiling portion of a reaction chamber 201, and respective electrodes 204 are arranged so that intervals therebetween are narrowed toward the center of the reaction chamber 201. The reaction chamber 201 is controlled to be a reductive atmosphere by introducing a gas. An AC power source 205 is connected to the respective electrodes 204, sequentially applying voltages having different phases to the respective electrodes 204 to thereby generate an arc discharge between the respective electrodes 204. A device for feeding a material as a raw material of fine particles and a material feeding piping part 211 are arranged in an upper part of the arc discharge. The material is fed to the arc discharge generated between the respective electrodes 204 from the material feeding piping part 211. The material fed from the material feeding piping part 211 is evaporated by the high-temperature arc discharge, reacting with a generated reactant (oxygen atoms, nitrogen atoms) and is rapidly cooled in a vapor phase, thereby generating fine particles of various kinds of compounds. In a lower side of the reaction chamber 201, a discharge port 226 discharging fine particles generated by the arc discharge and a ladle 227 temporarily reserving fine particles discharged from the discharge port 226 are provided.

When fine particles are produced by using the related-art apparatus for producing fine particles (see FIG. 4), it is extremely difficult to expand the discharge area of the arc discharge as the electrodes 204 are introduced from the upper surface of the reaction chamber 201. Moreover, as the material is continuously fed to the same place from the material feeding piping part 211, the material is continuously fed to a place where the plasma temperature has been reduced due to the material which has been previously fed. Accordingly, relatively large fine particles are formed, and the average particle diameter of generated particles is increased and distribution of particle diameters is deteriorated. As the feeding amount of the material have to be limited for obtaining a desired average particle diameter, it is difficult to increase the production of fine particles.

SUMMARY OF THE INVENTION

In view of the above problems, an object thereof is to provide an apparatus and method for producing fine particles capable of increasing the production and producing fine particles at low costs by feeding a large quantity of material into plasma efficiently.

According to an embodiment, an apparatus for producing fine particles includes a vacuum chamber, a material feeding device connected to the vacuum chamber and feeding material particles into the vacuum chamber from material feeding ports, a plurality of electrodes connected to the vacuum chamber, tip ends of which protrude into the vacuum chamber to generate plasma and a collecting device connected to the vacuum chamber and collecting fine particles, which generates discharge inside the vacuum chamber and produces the fine particles from the material, in which the material feeding ports of the material feeding device are arranged in a lower side than (below) the plural electrodes in the vertical direction in the vacuum chamber.

According to another embodiment, a method for producing fine particles using the apparatus for producing fine particles according to the above embodiment, includes the steps of generating arc discharge as the plasma by the plural electrodes inside the vacuum chamber and feeding the material into the vacuum chamber from the lower side of the generated arc discharge in the vertical direction by the material feeding device.

According to the embodiment, it is possible to provide an apparatus and method for producing fine particles capable of increasing the production amount of fine particles and producing fine particles at low costs by feeding a large quantity of material efficiently to a high-temperature area of plasma.

DESCRIPTION OF EMBODIMENTS

Hereinafter, embodiments will be explained in detail with reference to the drawings.

First Embodiment

Figure 1:
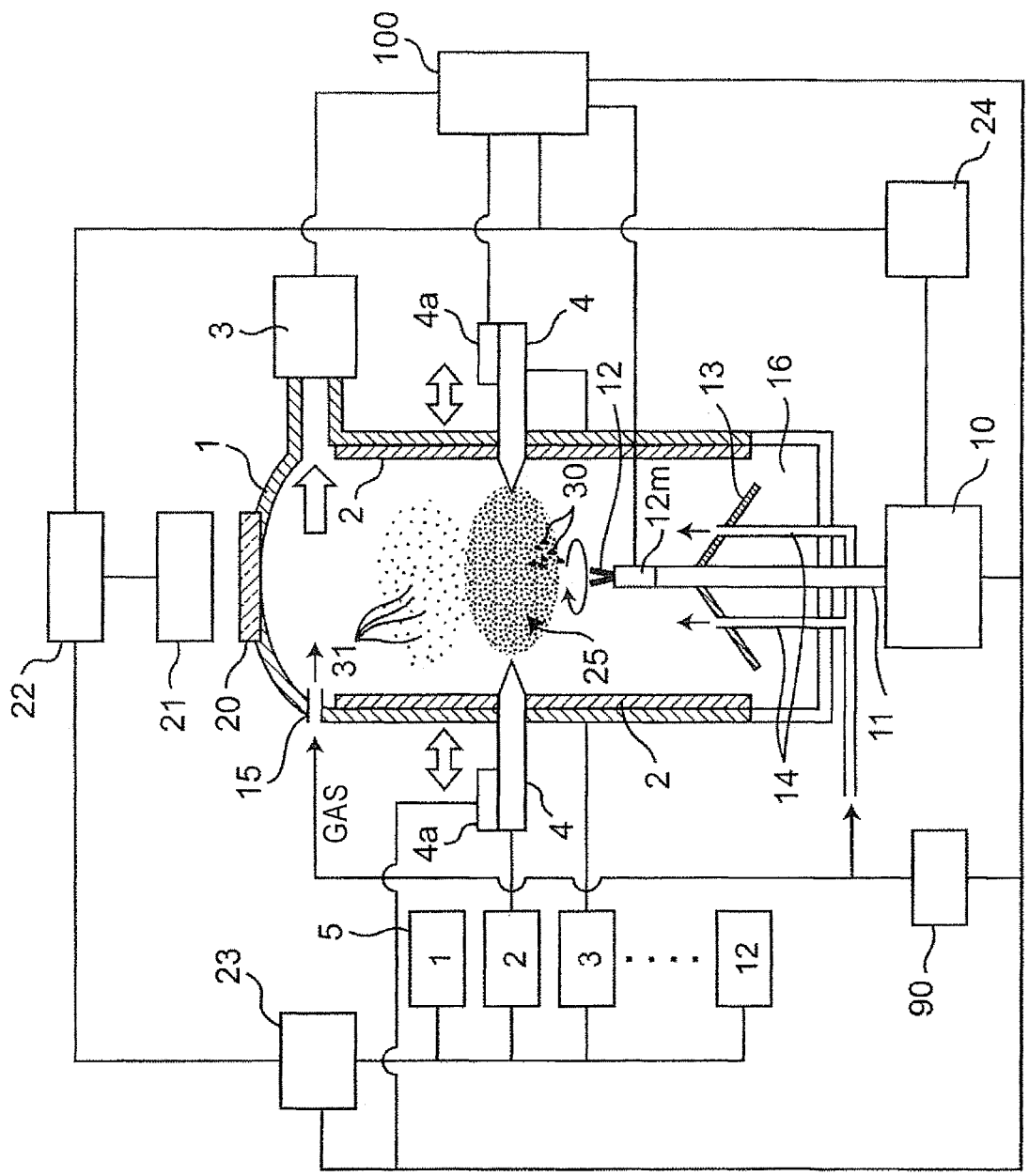
FIG. 1 is a schematic cross-sectional view of an apparatus for producing fine particles according to a first embodiment.
Figure 2:
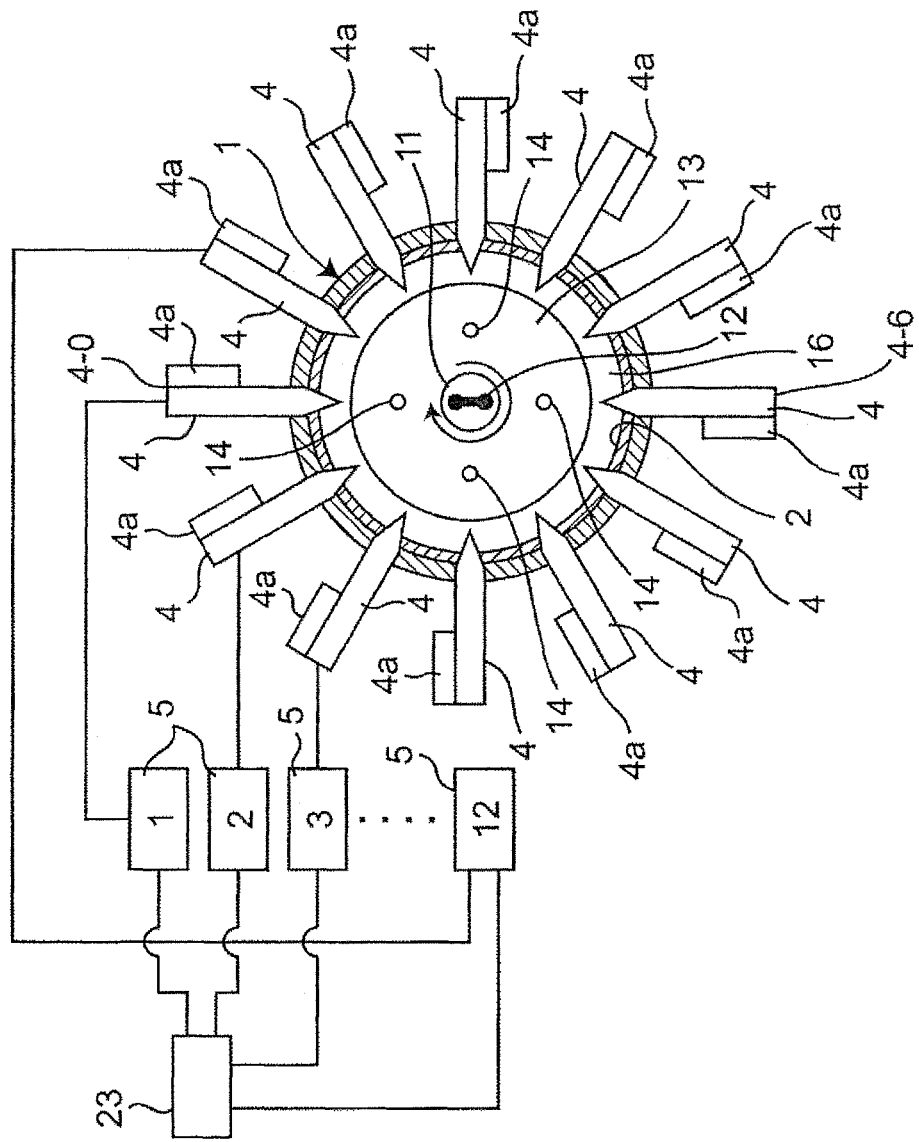
FIG. 2 is a schematic cross-sectional plan view of the apparatus for producing fine particles according to the first embodiment.
Figure 3:
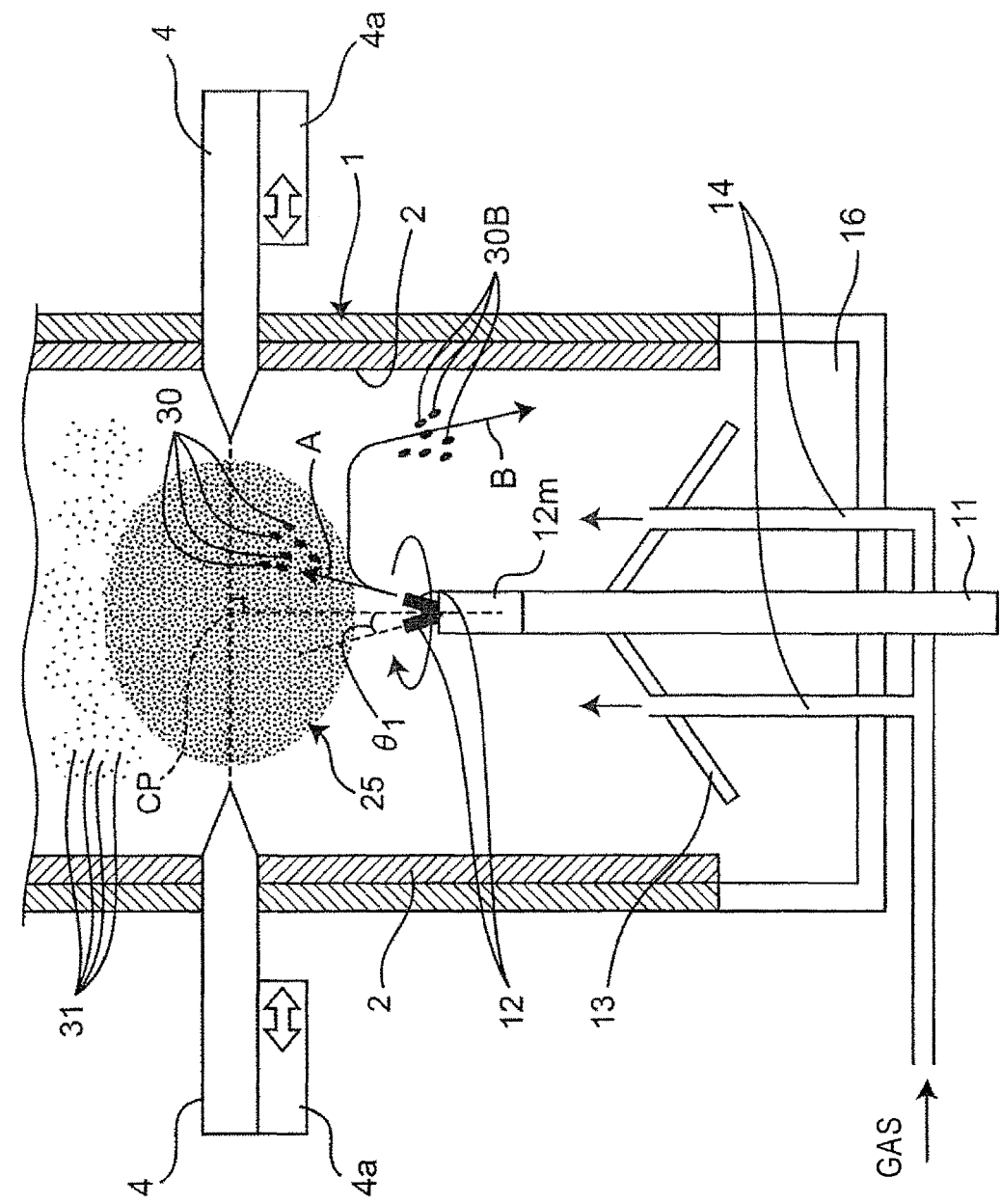
FIG. 3 is a schematic enlarged cross-sectional view of the apparatus for producing fine particles according to the first embodiment.
Figure 4:
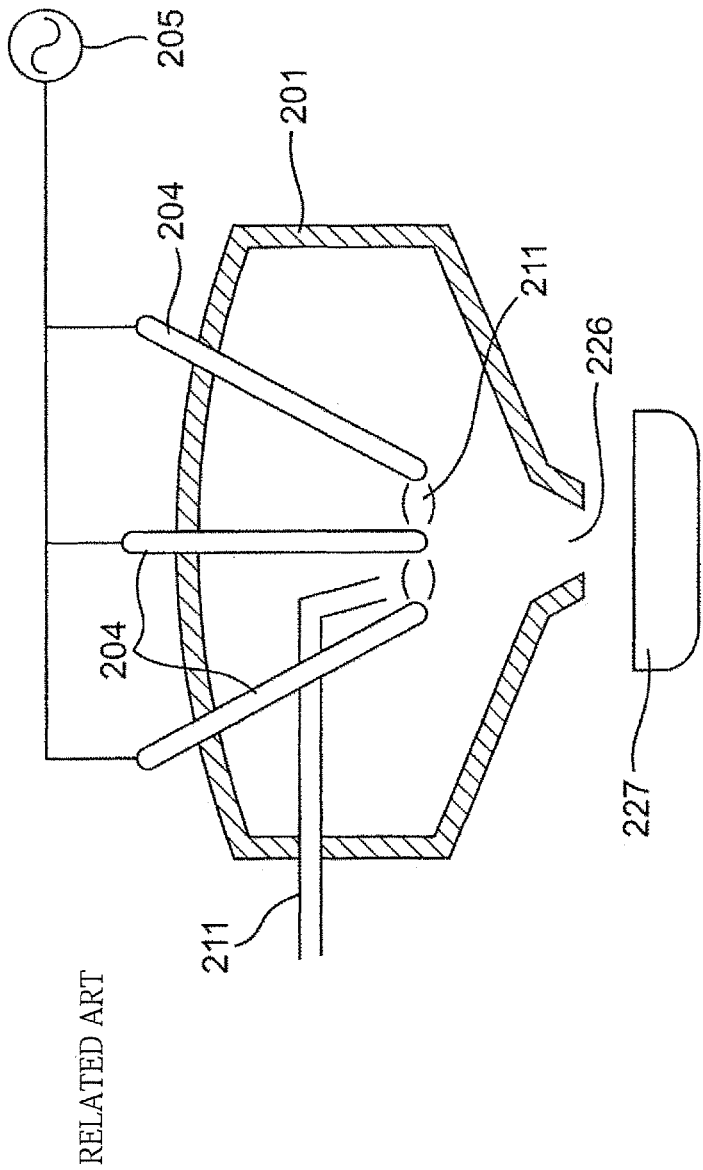
FIG. 4 is a schematic cross-sectional view of an apparatus for producing fine particles using multi-arc plasma in a related-art example 1.

FIG. 1 is a schematic vertical cross-sectional view of an apparatus for producing fine particles according to a first embodiment. FIG. 2 is a schematic cross-sectional plan view cut in the horizontal direction at an electrode part in the apparatus for producing fine particles according to the first embodiment. FIG. 3 is a schematic enlarged cross-sectional view of the apparatus for producing fine particles according to the first embodiment. A case in which fine particles of silicon in nanometer order are produced will be explained with reference to FIG. 1 to FIG. 3 as an example.

The apparatus for producing fine particles according to the first embodiment at least includes a reaction chamber 1 as an example of a vacuum chamber, a material feeding device 10, a plurality of electrodes 4 which generate arc discharge and a fine particle collecting part 3 as an example of a collecting device which collects generated fine particles. In the first embodiment, the apparatus for producing fine particles further includes a material feeding pipe 11, gas supply pipes 14 and 15 supplying gas so as to control the flow of the fed material and generated fine particles, an optical measuring device 21 for analyzing plasma and a measurement window 20.

The reaction chamber 1 can exhaust air from the fine particle collecting part 3 by a not-shown exhaust mechanism. A plurality of gas supply pipes 14 in a lower side penetrate a conical cover 13 around a lower part of the material feeding pipe 11 and stand upward in a vertical direction in a lower part of the reaction chamber 1, which are arranged so that the gas is supplied upward in the vertical direction. The gas supply pipe 15 in an upper side is arranged in a side wall in the vicinity of an upper end of the reaction chamber 1 so that the gas is supplied toward the fine particle collecting part 3. The atmosphere inside the reaction chamber 1 can be controlled by supplying the gas into the reaction chamber 1 from a gas supply device 90 through the gas supply pipes 14 and 15. In a first example in the first embodiment, the following processes of producing fine particles were performed while maintaining the inside of the reaction chamber 1 in a pressure close to the atmospheric pressure in an inert gas atmosphere of argon by supplying argon into the reaction chamber 1 from the gas supply device 90 through the gas supplying pipes 14 and 15. It is also preferable to introduce the gas with hydrogen gas and a small quantity of carbide-based gas into the reaction chamber 1 from the gas supply device 90 through the gas supplying pipes 14 and 15 for promoting reduction of the material.

An inner surface of a side wall of the reaction chamber 1 which has a not-shown cooling mechanism inside the cylindrical side wall is covered with a thermal insulation material 2 which is made of, for example, ceramic for transmitting heat of arc discharge (plasma) to the material efficiently. As an example, twelve electrodes 4 made of carbon which generate arc discharge are radially arranged on the circumferential wall of the reaction chamber 1 at intervals of 30 degrees in a state where tip ends protrude into the reaction chamber 1 in the lateral direction (for example, along the horizontal direction) as shown in FIG. 2. As an example, tip ends of respective electrodes 4 are set in one plane in the lateral direction. Though twelve electrodes 4 are radially arranged in the first example, the number of electrodes may be increased or it is possible to arrange the electrodes not only in the same plane but also in multiple stages such as two stages or three stages as long as the numbers of electrodes are multiples of 6. When the electrodes 4 are arranged in multiple stages, the arc discharge as a heat source for evaporating the material can be further expanded in the vertical direction, which is advantageous to generate a large quantity of fine particles. Carbon is used as an example of the material for the electrodes 4 for performing arc discharge easily, however, metal electrodes made of a high-melting point metal such as tungsten or tantalum may be used. When the metal electrode is used as a material for the electrodes 4, it is preferable to adopt a mechanism which can cool the metal electrodes by water cooling or by allowing cooling gas to flow to prevent the material of the metal electrodes from being evaporated and mixed with generated fine particles or to prevent the material from reacting with the generated fine particles and making an alloy.

As shown in FIG. 1 and FIG. 2, AC power sources 5 are respectively connected to the plural electrodes 4, which can respectively apply AC voltages of 60 Hz in which phases are shifted by 30 degrees. The respective electrodes 4 can be moved independently in radial directions to the center of the reaction chamber 1 by electrode driving devices 4a including motors and so on. Therefore, when an arc discharge 25 is ignited, the respective electrodes 4 are moved to the central side (toward the central vertical axis) of the reaction chamber 1 by the electrode driving devices 4a until tip ends of respective electrodes 4 touch one another. After the arc discharge 25 is ignited, the electrodes 4 are moved in the radial directions (directions toward the outer side from the central position of the electrodes 4 which are radially arranged) by the electrode driving devices 4a while adjusting the electric current applied to respective electrodes 4 to become constant so that tip ends of the electrodes 4 are moved away to the vicinity of the wall. Accordingly, the area of the arc discharge 25 which is thermal plasma of approximately 10000° C. is increased and the throughput can be increased. As an example of the electrode driving device 4a, there exists one which moves the electrode 4 connected to a nut member screwed to a ball screw forward and backward in the axial direction by rotating the ball screw forward and reversely by the motor.

As an example of a material 30 to be a raw material of fine particles 31, silicon powder of approximately 16 μm is used, which is set inside the material feeding device 10. Though the particles of 16 μm is used in the first example, materials having particle diameters of 1 μm or more to 100 μm or less can be evaporated though depending on plasma conditions, and fine particles 31 in nanometer order can be produced. When the materials having particle diameters larger than 100 μm are used, it is difficult to evaporate the material completely, and fine particles to be produced will be large in size. The material feeding device 10 is formed of a local fluidized powder supply device as an example. In the local fluidized powder feeding device, the powder material can be fed to the material feeding pipe 11 at a fixed rate by controlling the feeding amount of the material using the flow rate of argon gas as a carrier gas and the turnover of vessels introducing the material.

As other examples of the material feeding device 10, there are a surface profiling powder feeder which controls the distance between the surface of powder material and a nozzle by using a laser and so on, a fixed quantity powder feeder which supplies a fixed quantity of powder material to a groove from a hopper and so on and sucks the material using a gas, and other devices. Any type of powder material feeder may be used, and the feeder may be properly used according to the quantity of powder material to be fed.

As shown in a course A in the enlarged view of FIG. 3, the material particles 30 fed from the material feeding device 10 with the carrier gas are fed to the material feeding pipe 11 and introduced into the reaction chamber 1 from plural material feeding ports 12 as an example of a material feeding port. The material particles 30 introduced into the reaction chamber 1 are evaporated or vaporized (hereinafter typically referred to as "evaporated") to be a material gas when passing in the arc discharge 25. The evaporated material gas moves upward inside the reaction chamber 1 by an updraft due to the heat of the arc discharge 25 or the gas flow from the gas supply pipes 14. The material gas is cooled rapidly just after passing through the area of the arc discharge 25, and spherical fine particles 31 are produced. Plural gas supply pipes 14 for feeding the material particles 30 or the fine particles 31 generated by the arc discharge 25 in the fixed direction (upward in the vertical direction) are provided in the cover 13 in the lower part around the material feeding pipe 11, and an atmosphere gas is supplied in the fixed direction (upward in the vertical direction) from the gas feeding pipes 14. The material feeding pipe 11 and the material feeding ports 12 are installed in the lower side of (below) a central position CP of the plural electrodes 4 with respect to the vertical direction. In particular, the material feeding ports 12 are disposed so as to be positioned in a lower part than (below) the area of the arc discharge 25 as described later. The plural material feeding ports 12 have a rotating device 12m such as a motor for feeding the material in a wide range, so that the feeding ports 12 can feed the material while rotating in upper and lower direction, for example, around a rotation axis extending along the upper and lower direction, namely, in the vertical direction at a tilt angle ($\theta_1$) with respect to the central position (vertical upward direction) CP of the electrodes 4. The tilt angle $\theta_1$ is a tilt angle between the vertical axis and a direction in which the material feeding port 12 is directed (feeding direction of the material), which is a smaller angle as shown in FIG. 3. The tilt angle $\theta_1$ of the material feeding port 12 is preferably 5 degrees or more and 30 degrees or less (i.e., in a range between 5 degrees and 30 degrees, inclusive). In the arc discharge 25 having the plural electrodes 4, the discharge hardly occurs between opposite electrodes (for example, between an electrode 4-0 positioned in a direction of 0 O'clock and an electrode 4-6 positioned in a direction of 6 O'clock) which are most distant from each other, and the temperature in the vicinity of the center of discharge may be lower than the temperature around the electrodes. Accordingly, the feeding material can be evaporated efficiently by feeding a smaller quantity of material to the central part of the arc discharge 25 and feeding a larger quantity of material to the vicinity of electrodes. When the tilt angle $\theta_1$ is smaller than 5 degrees, the processing efficiency is reduced as a large quantity of material is fed to the vicinity of the center of the arc discharge 25. When the material is fed with the tilt angle $\theta_1$ larger than 30 degrees, the material can be fed to the vicinity of the electrodes, however, the material escapes from the range of the arc discharge 25 soon. Therefore, a period of time during which the heat is given to the fed material is reduced and the diameter of fine particles to be generated is increased. Accordingly, the tilt angle ($\theta_1$) between the vertical direction and the direction in which the material feeding port 12 is directed (feeding direction of the material) is preferably 5 degrees or more to 30 degrees or less for allowing the material to pass through the periphery of the arc discharge 25 where the temperature is high as well as through the area to which the arc discharge 25 extends for a long period of time.

Generally, as the temperature of plasma is deprived by evaporation of the material in the arc discharge 25 where the material is fed, the temperature of arc discharge where the material is evaporated is reduced. In the case where the material is continuously fed to continuous discharge such as a common inductively coupled plasma (ICP) torch in related art, the temperature of plasma is reduced by evaporation of the material and it is difficult to evaporate the material completely. As a result, relatively large fine particles are generated and the average particle diameter of the produced fine particles is increased or the distribution of particle diameters is deteriorated. As the feeding amount of the material have to be limited for producing fine particles with a desired particle diameter or for improving the distribution of particle diameters of the produced fine particles, the throughput is reduced.

In response to the above, in the arc discharge 25 generated by the plural electrodes 4 used in the first example, the AC power sources 5 which can supply the power with different phases, for example, the power of 60 Hz in which phases are shifted by 30 degrees are respectively used as power sources for the plural electrodes 4. Accordingly, the discharge is performed in a pulse shape and high-temperature thermal plasma can be constantly generated as the arc discharge 25. Furthermore, as the material can be fed in a pulsed manner by combining with the above material feeding method, the effects of reduction in plasma temperature due to evaporation of the material can be reduced and the heat of the arc discharge 25 can be utilized for evaporation of the material extremely efficiently. Accordingly, the increase of throughput at the time of producing fine particles can be expected.

As the high-temperature plasma such as the arc discharge 25 is a viscous gas, the material does not enter the arc discharge 25 and is not processed like material particles 30B shown in a course B of FIG. 3, unless the material has a certain speed like the material particles 30. In the present apparatus in which the material feeding device 10 and the material feeding ports 12 are arranged in the lower side of the arc discharge 25 in the vertical direction and the material particles 30 are fed from the lower side of the arc discharge 25 in the vertical direction, unprocessed material particles 30B repelled by the arc discharge 25 fall down to the lower side in the vertical direction due to the gravity, which are positively separated from the processed fine particles 31 positioned in the upper direction of the arc discharge 25. Additionally, particles which have grown larger in the arc discharge because materials are copolymerized with each other due to some reasons also fall down to the lower side in the vertical direction due to the gravity. Therefore, such particles can be separated from the generated fine particles 31. The material particles 30B which have not been completely processed or which have not been processed are reserved in an unprocessed material reservoir 16 installed in the bottom of the reaction chamber 1 as well as the lower side of the material feeding ports 12. The material reserved in the unprocessed material reservoir 16 can be returned to the material feeding device 10 and used again, which increases the efficiency of utilizing the material.

As shown in FIG. 1, the measurement window 20 is installed in an upper part (for example, an upper end in the center) of the reaction chamber 1 so as to observe the range of electric discharge of the arc discharge 25, and the optical measuring device 21 is attached. It is possible to measure in-plane distribution, as an example, of light emission of argon as a gas component of the arc discharge 25, silicon as a feeding material component or oxygen/carbon as an impurity in the reaction chamber 1 by the optical measuring device 21 through the measurement window 20. The measurement results are compared with information (reference information) in a good processing state in an analyzer 22, thereby measuring the distribution of the arc discharge 25, the distribution of evaporation of the material and so on in real time. The analyzation results are fed back to an AC power source controller 23 from the analyzer 22 to thereby adjust voltage values or current values of the AC power sources 5 connected to the respective electrodes 4 by the AC power source controller 23 so that the distribution of the arc discharge 25 is constant. Accordingly, the distribution of the arc discharge 25 becomes constant and the material can be processed efficiently. Also, the analyzation results are fed back to a material feeding controller 24 from the analyzer 22 to thereby adjust the material feeding amount by the material feeding device 10, the rotational speed of the material feeding ports 12 by the rotating device 12m, the flow rate of gas supplied to the reaction chamber 1 from the gas supply device 90 and so on by the material feeding controller 24 or a later-described controller 100. Accordingly, the material can be processed efficiently. The above two feedbacks may be performed together. In this case, it is preferable to use the later-described controller 100. The current supply by the AC power sources 5 is thus performed so as to correspond to the rotation of the material feeding ports 12, thereby drastically improving the processing efficiency.

As shown in FIG. 1, fine particles 31 generated by the arc discharge 25 and lighter than the gravity (i.e., able to resist gravity and float) are collected by the fine particle collecting part 3 having an exhaust mechanism due to the gas flow supplied from the gas supply pipe 15. The fine particle collecting part 3 is provided with a cyclone which can classify fine particles larger than an arbitrary diameter and a bag filter which can collect desired fine particles, though not shown. When the collected fine particles are taken out, the particles are left under an atmosphere containing the air of approximately 1% for several hours and taken out to the air after gradual oxidation treatment is performed because there is a danger of ignition in the atmospheric pressure. Accordingly, the surface of fine particles of silicon is oxidized approximately 1 to 2 nanometer, which can be taken out safely.

The method for producing fine particles of silicon (Si) in nanometer order has been explained in the first example. It is also preferable to produce fine particles by using inorganic materials including metals such as nickel (Ni), silver (Ag) and copper (Cu) or glass ($SiO_2$), silicon nitride (SiN) and Alumina ($Al_2O_3$) as materials for producing fine particles. It is also preferable to produce fine particles of silicon monoxide (SiOx: x=1 to 1.6), silicon nitride (SiNx: x=0.1 to 1.3) or silicon carbide (SiCx) by using silicon materials by making the material react with a gas introduced into the reaction chamber 1. It is further possible to produce composite materials containing plural materials, for example, including a silicon core inside and covered with alumina or silicon carbide and so on from the outside.

The controller 100 which controls processing of producing fine particles is provided, and the driving of the material feeding device 10, the exhaust mechanism of the fine particle collecting part 3, the gas supply device 90, the respective electrode driving devices 4a, the AC power source controller 23, the material feeding controller 24 and the rotating device 12m is controlled respectively by the controller 100 for the processing of producing fine particles.

It is also possible to control the driving of the material feeding device 10, the exhaust mechanism of the fine particle collecting part 3, the gas supply device 90, the respective electrode driving devices 4a, the AC power source controller 23, the material feeding controller 24 and the rotating device 12m respectively by the controller 100 based on information of the measurement results from the analyzer 22 according to need.

As the material feeding ports 12 of the material feeding device 10 are arranged in the lower side than (below) the plural electrodes 4 in the vertical direction in the reaction chamber 1 according to the first embodiment, the thermal plasma 25 with a large area can be generated. A large quantity of material 30 is supplied to the high-temperature area of the plasma 25 efficiently, thereby increasing the production amount of the fine particles 31 as well as producing the fine particles 31 at low costs. Moreover, unprocessed materials 30B are separated from the generated fine particles 31. Therefore, the particle diameters of the fine particles 31 to be generated are easily averaged, and stable processing can be realized.

Also according to the first embodiment, the arc discharge 25 can be generated by connecting the AC power sources 5 to the plural electrodes 4 respectively. Therefore, it is possible to increase the area of the plasma 25 for evaporating the material 30 as compared with other methods.

Also according to the first embodiment, the material feeding device 10 has plural material feeding ports 12, and the material feeding ports 12 are rotated by the rotating device 12m. Therefore, a large quantity of material can be fed in a pulsed manner to the high-temperature area of the generated plasma.

Furthermore, according to the first embodiment, the material feeding ports 12 of the material feeding device 10 are arranged in the lower side of (below) the central position CP in the vertical direction where tip ends of the plural electrodes 4 overlap, and the tilt angle ($\theta_1$) made by the material feeding port 12 and an upward direction in the vertical direction is 5 degrees or more and 30 degrees or less. Therefore, a large quantity of material can be fed to the high-temperature area of the generated plasma.

Furthermore, according to the first embodiment, the window 20 for observing the discharge is installed above the plural electrodes 4 which generate plasma, and the controller 100 which adjusts any one of or both of the AC power sources 5 attached to the electrodes 4 and the material feeding device 10 based on the results obtained by analyzing the discharge state measured by the optical measuring device 21 by the analyzer 22 is included. Therefore, the material can be fed to the high-temperature area of the generated plasma efficiently.

Arbitrary embodiments or modification examples in the above various embodiments and modification examples can be combined appropriately, thereby obtaining advantages generated by respective examples. It is possible to combine embodiments with each other, to combine examples with each other and to combine an embodiment and an example as well as to combine characteristics in different embodiments or different examples with each other.

The apparatus and method for producing fine particles according to the present invention can increase the production amount of fine particles as well as produce fine particles at low costs by feeding a large quantity of material efficiently to the high-temperature area of plasma, therefore, the present invention is useful as the apparatus and method for producing fine particles used for mass production of devices such as electrodes of batteries and ceramic capacitors.

What is claimed is:

1. An apparatus for producing fine particles comprising:
a vacuum chamber;
a material feeding device connected to the vacuum chamber and having material feeding ports for feeding material particles into the vacuum chamber;
a plurality of electrodes connected to the vacuum chamber, tip ends of the electrodes protruding into the vacuum chamber to generate plasma; and
a collecting device connected to the vacuum chamber to collect fine particles,
wherein the electrodes are configured to generate discharge inside the vacuum chamber to produce the fine particles from the material particles, and
wherein the material feeding ports of the material feeding device are arranged below a vertical position of the tip ends of the plurality of electrodes in the vacuum chamber, and the collecting device is arranged above the vertical position of tip ends of the plurality of electrodes so as to collect the fine particles.

2. The apparatus for producing fine particles according to claim 1, wherein AC power sources are respectively connected to the plurality of electrodes to generate arc discharge as the plasma.

3. The apparatus for producing fine particles according to claim 1, wherein the material feeding device further includes a rotating device rotating the material feeding ports around a vertical axis of rotation.

4. The apparatus for producing fine particles according to claim 3, wherein:
the material feeding ports of the material feeding device are arranged below a vertical position where tip ends of the plurality of electrodes overlap, and
a tilt angle between a direction in which each of the material feeding ports is directed and a vertical axis is within a range of 5 degrees to 30 degrees, inclusive.

5. The apparatus for producing fine particles according to claim 1, further comprising:
a window for allowing observation of discharge above the plurality of electrodes; and
a controller configured to adjust at least one of (i) AC power sources connected to the plurality of electrodes, and (ii) a material feeding amount of the material feeding device based on results obtained by analyzing discharge states by an optical measuring device through the window.

6. An apparatus for producing fine particles comprising:
a vacuum chamber;
a material feeding device connected to the vacuum chamber and having material feeding ports for feeding material particles into the vacuum chamber;
a plurality of electrodes connected to the vacuum chamber, tip ends of the electrodes protruding into the vacuum chamber to generate plasma;
a collecting device connected to the vacuum chamber to collect fine particles; and
a rotating device rotating the material feeding ports around a vertical axis of rotation,
wherein the electrodes are configured to generate discharge inside the vacuum chamber to produce the fine particles from the material particles,
wherein the material feeding ports of the material feeding device are arranged below a vertical position of the plurality of electrodes in the vacuum chamber.

7. The apparatus for producing fine particles according to claim 6, wherein:
the material feeding ports of the material feeding device are arranged below a vertical position where tip ends of the plurality of electrodes overlap, and
a tilt angle between a direction in which each of the material feeding ports is directed and a vertical axis is within a range of 5 degrees to 30 degrees, inclusive.

* * * * *